United States Patent
Kobayashi et al.

(10) Patent No.: US 6,437,042 B2
(45) Date of Patent: Aug. 20, 2002

(54) METHOD FOR PRODUCING SUSPENSION OF CROSSLINKED SILICONE PARTICLES

(75) Inventors: Kazuo Kobayashi; Yoshitsugu Morita; Ken Tanaka, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/753,772

(22) Filed: Jan. 3, 2001

(30) Foreign Application Priority Data

Feb. 29, 2000 (JP) ......................................... 2000-054602

(51) Int. Cl.$^7$ .............................................. C08G 77/08
(52) U.S. Cl. .................... 524/837; 528/18; 523/435; 523/204; 523/209; 524/588; 524/589; 524/506; 524/731; 525/100; 525/106; 525/476; 525/477; 525/464; 525/453; 525/452; 525/431; 428/403; 428/405
(58) Field of Search .................. 524/837, 506, 524/589, 731, 588; 528/18; 525/100, 106, 431, 452, 453, 476, 477; 523/464, 435, 204, 209; 428/405, 403

(56) References Cited

U.S. PATENT DOCUMENTS

| | | | | |
|---|---|---|---|---|
| 4,277,382 A | * | 7/1981 | Lin et al. ................ | 260/29.2 M |
| 4,618,645 A | * | 10/1986 | Bauman et al. .............. | 524/745 |
| 5,064,894 A | * | 11/1991 | Desmonceau et al. ....... | 524/503 |
| 5,777,026 A | * | 7/1998 | Berg et al. .................. | 524/837 |
| 5,939,478 A | * | 8/1999 | Beck et al. .................. | 524/266 |
| 6,239,211 B1 | * | 5/2001 | Keeping et al. ............. | 524/588 |

FOREIGN PATENT DOCUMENTS

| | | | |
|---|---|---|---|
| JP | 63-202658 | 8/1988 | ............... C08J/3/02 |
| JP | 64-70558 | 3/1989 | ........... C08L/83/04 |
| JP | 10-36674 | 2/1998 | ........... C08L/83/06 |

* cited by examiner

Primary Examiner—Margaret G. Moore
(74) Attorney, Agent, or Firm—Jim L. De Cesare; Catherine U. Brown

(57) ABSTRACT

A suspension containing crosslinked silicone particles with a lower mean particle diameter and a better dispersion in certain organic resins is prepared by emulsifying a condensation crosslinkable silicone composition containing (A) an organopolysiloxane having at least two silanol groups per molecule and (B) a crosslinker, but no (C) condensation catalyst, in water using a surfactant. A tin (II) salt of an organic acid with no more than ten carbon atoms is then emulsified in water with a surfactant, and added as the component (C) to the emulsion of condensation crosslinkable silicone composition. This crosslinks the emulsion of condensation crosslinkable silicone composition.

14 Claims, No Drawings

METHOD FOR PRODUCING SUSPENSION OF CROSSLINKED SILICONE PARTICLES

FIELD OF THE INVENTION

This invention is directed to a method for crosslinking a condensation crosslinkable silicone composition to produce crosslinked silicone particles. In particular, it relates to a method for efficiently producing crosslinked silicone particles with a lower mean particle diameter and better dispersion in organic resins.

BACKGROUND OF THE INVENTION

In Japanese Unexamined Patent Applications Kokai No. 63-202658/EP 350 519 (Jan. 17, 1990), Kokai No. 64-70558/EP 304 946 (Mar. 1, 1989), and Kokai No. 10-36674, methods are described for producing crosslinked silicone particles, in which a condensation crosslinkable silicone composition containing an organopolysiloxane with at least two silanol groups per molecule, a crosslinker, and a condensation catalyst, is crosslinked while emulsified in water using a surfactant.

However, when such a condensation crosslinkable silicone composition is emulsified in water with a surfactant, the crosslinker and condensation catalyst are mixed as a separately blended silicone composition is cooled. Unless the silicone composition mixed in this manner is emulsified in cold water, problems occur such that the composition continues to undergo crosslinking while emulsified, making it impossible to achieve a homogenous emulsion. Crosslinked silicone particles also have a large mean particle diameter.

These Kokai applications provide that the condensation crosslinkable silicone composition can be emulsified in water and then crosslinked by addition of the condensation catalyst, but after the condensation crosslinkable silicone composition without the condensation catalyst has been first emulsified in water using a surfactant.

BRIEF SUMMARY OF THE INVENTION

It is therefore an object of the present invention is to provide a method for crosslinking a condensation crosslinkable silicone composition to efficiently produce crosslinked silicone particles with a lower mean particle diameter, and with a better dispersion in organic resins.

Thus, the invention relates to a method for producing crosslinked silicone particles with a mean particle diameter of 0.1-500 μm, in which a condensation crosslinkable silicone composition containing (A) an organopolysiloxane having at least two silanol groups per molecule, and (B) a crosslinker, but without a (C) condensation catalyst, is first emulsified in water using a surfactant. An emulsion containing a tin (II) salt of an organic acid with no more than 10 carbon atoms is emulsified in water using a surfactant, and is added as component (C) to the emulsion of the condensation crosslinkable silicone composition. This crosslinks the emulsified condensation crosslinkable silicone composition.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

In the method of the present invention, a condensation crosslinkable silicone composition containing (A) an organopolysiloxane having at least two silanol groups per molecule and (B) a crosslinker, but no (C) condensation catalyst, is first emulsified in water with a surfactant.

Organopolysiloxane (A) is the primary component of the condensation crosslinkable silicone composition, and should have at least two silanol groups in its molecule. The silanol groups in organopolysiloxane (A) are preferably at the terminals of the molecular chain. Examples of silicon atom bonded organic groups which can also be present in organopolysiloxane (A) include alkyl groups such as methyl, ethyl, propyl, and butyl; alkenyl groups such as vinyl and allyl; aryl groups such as phenyl; aralkyl groups such as benzyl and phenethyl; cycloalkyl groups such as cyclopentyl and cyclohexyl ; and substituted monovalent hydrocarbon groups such as 3-chloropropyl, 3,3,3-trifluoropropyl, and other such halogenated alkyl groups.

The molecular structure of organopolysiloxane (A) may be linear, linear with some branching, branched, or reticulated. While the viscosity of organopolysiloxane (A) at 25 °C. is not particularly limited, it is preferably 5-1,000,000 mPa·s, more preferably 5-10,000 mPa·s, and even more preferably 5-1,000 mPa·s. This is because the physical properties of the crosslinked silicone particles tend to suffer when the viscosity of organopolysiloxane (A) at 25° C. is lower than the minimum of the range, whereas a viscosity over the maximum of the range makes it more difficult to emulsify the composition in water.

A crosslinker (B) is used to crosslink the condensation crosslinkable silicone composition by condensation with the silanol groups in organopolysiloxane (A). Examples of suitable crosslinkers (B) include (i) silanes having at least three silicon atom bonded hydrolysable groups or partially hydrolyzed condensates thereof, and (ii) organosiloxanes having at least three silicon atom bonded hydrogen atoms per molecule.

The silicon atom bonded hydrolysable groups which may be present in silanes of crosslinker (B)(i) include alkoxy groups such as methoxy, ethoxy, and methoxyethoxy; oxime groups such as methyl ethyl ketoxime; acetoxy groups; and aminoxy groups. Examples of silanes or siloxanes of crosslinker (B)(i) include alkoxysilanes such as methyltrimethoxysilane, ethyl trimethoxysilane, methyltris(methoxy ethoxy)silane, tetramethoxysilane, tetraethoxysilane, and partially hydrolyzed condensates thereof; oxime silanes such as methyltris(methyl ethyl ketoxime)silane, ethyltris(methyl ethyl ketoxime)silane, tetra(methyl ethyl ketoxime)silane, and partially hydrolyzed condensates thereof; acetoxysilanes such as methyltriacetoxysilane ethyltriacetoxysilane, tetracetoxysilane, and partially hydrolyzed condensates thereof; and aminoxysilanes such as methyltris(trimethyl aminoxy)silane, ethyltris(trimethyl aminoxy)silane, tetra(trimethyl aminoxy)silane, and partially hydrolyzed condensates thereof. Alkoxysilanes and partially hydrolyzed condensates thereof are preferred, while alkyl polysilicates which are partially hydrolyzed condensates of tetralkoxysilanes are particularly preferred.

Examples of silicon atom bonded organic groups which may be present in crosslinker (B)(ii) include alkyl groups such as methyl, ethyl, propyl, and butyl; alkenyl groups such as vinyl and allyl; aryl groups such as phenyl; aralkyl groups such as benzyl and phenethyl; cycloalkyl groups such as cyclopentyl and cyclohexyl; and substituted monovalent hydrocarbon groups such as 3-chloropropyl, 3,3,3-trifluoropropyl, and other such halogenated alkyl groups.

The molecular structure of crosslinker (B)(ii) may be linear, linear with some branching, branched, reticulated, and cyclic. Some examples of organopolysiloxanes of crosslinker (B)(ii) include methylhydridopolysiloxanes with trimethylsiloxy groups at both ends of the molecular chain, dimethylsiloxane methylhydridosiloxane copolymers with trimethylsiloxane groups at both ends of the molecular chain, dimethylsiloxane methylhydridosiloxane copolymers with dimethylhydridosiloxy groups at both ends of the molecular chain, cyclic methylhydridopolysiloxanes, and organopolysiloxanes with part or all methyl groups in the siloxane substituted by alkyl groups such as ethyl or aryl groups such as phenyl.

The condensation crosslinkable silicone composition contains crosslinker (B) in an amount sufficient to crosslink the condensation crosslinkable silicone composition. Specifically, the amount crosslinker (B) should be 0.1-50 weight parts per 100 weight parts of organopolysiloxane (A). The reason is that an amount of crosslinker (B) less than the minimum range can result in insufficient crosslinking, whereas an amount more than the maximum range can result in crosslinked silicone particles with diminished physical properties.

The condensation crosslinkable silicone composition may contain other optional components such as (D) organoalkoxysilanes containing groups such as $C_5$ or greater alkyl groups, (meth)acrylic groups, epoxy groups, mercapto groups, amino groups, alkenyl groups, or partially hydrolyzed condensates thereof. Examples of organoalkoxysilane (D) include alkyl group containing alkoxysilanes such as pentyltrimethoxysilane, hexyltrimethoxysilane, octyltrimethoxysilane, and partially hydrolyzed condensates thereof; (meth)acrylic group containing alkoxysilanes such as 3-methacryloxypropyl trimethoxysilane, 3-methacryloxypropyl methyldimethoxysilane, 3-methacryloxypropyl dimethylmethoxysilane, and partially hydrolyzed condensates thereof; epoxy group containing alkoxysilanes such as 3-glycidoxypropyltrimethoxysilane, 3-glycidoxypropylmethyl dimethoxysilane, 2-(3,4-epoxycyclohexyl)ethyl trimethoxysilane, 2-(3,4-epoxycyclohexyl)ethyl methyldimethoxysilane, 4-oxiranylbutyl trimethoxysilane, 4-oxiranylbutyl triethoxysilane, 4-oxiranylbutyl methyldimethoxysilane, 8-oxiranyloctyl trimethoxysilane, 8-oxiranyloctyl triethoxysilane, 8-oxiranyloctyl methyldimethoxysilane, and partially hydrolyzed condensates thereof; 3-mercaptopropyltrimethoxysilane, 3-mercaptopropyl methyldimethoxysilane, and partially hydrolyzed condensates thereof; amino group containing alkoxysilanes such as 3-aminopropyltrimethoxysilane, N-(2-aminoethyl)-3-aminopropyltrimethoxysilane, N-(2-aminoethyl)-3-aminopropyl methyldimethoxysilane, 3-anilinopropyl trimethoxysilane, and partially hydrolyzed condensates thereof; and alkenyl group containing alkoxysilanes such as vinyltrimethoxysilane, allyltrimethoxysilane, hexenyltrimethoxysilane, and partially hydrolyzed condensates thereof.

The content of organoalkoxysilane (D) in the condensation crosslinkable silicone composition is not particularly limited, but should preferably be present in the amount of 0.1-10 weight percent of the condensation crosslinkable silicone composition, more preferably 0.5-5 weight percent. An organoalkoxysilane (D) content lower than the minimum of the range can result in crosslinked silicone particles having poor adhesion with organic resins, whereas an amount greater than the maximum of the range can result in crosslinked silicone particles with diminished physical properties.

The condensation crosslinkable silicone composition may contain a reinforcing filler such as precipitated silica, fumed silica, sintered silica, and fumed titanium oxide; a nonreinforcing filler such as milled quartz, diatomaceous earth, asbestos, alumino silicic acid, iron oxide, zinc oxide, and calcium carbonate; a filler treated with an organosilicon compound such as an organochlorosilane, organoalkoxysilane, organosilazane, and organosiloxane oligomer. In addition, the condensation crosslinkable silicone composition can include a pigment, an organic compound with an epoxy or amino group, a heat resistant imparting agent, a flame retardant, plasticizer, or non-crosslinking type of organopolysiloxane.

A device such as a colloid mill, homomixer, or homogenizer can be used to emulsify the condensation crosslinkable silicone composition in water with a surfactant. Since the condensation crosslinkable silicone composition does not contain a condensation catalyst during emulsification, the condensation crosslinkable silicone composition can be fully emulsified, and can even be heated to some extent, during emulsification. The condensation crosslinkable silicone composition can therefore be sufficiently emulsified in water, which results in the production of crosslinked silicone particles with a lower mean particle diameter and which are more uniformly granular.

Surfactants which can be used include anionic surfactants such as hexylbenzene sulfonic acid, octylbenzene sulfonic acid, decylbenzene sulfonic acid, dodecylbenzene sulfonic acid, cetylbenzene sulfonic acid, myristylbenzene sulfonic acid, and sodium salts thereof; cationic surfactants such as octyl trimethylammonium hydroxide, dodecyl trimethylammonium hydroxide, hexadecyl trimethylammonium hydroxide, octyl dimethylbenzyl ammonium hydroxide, decyl dimethyl benzylammonium hydroxide, dioctadecyl dimethylammonium hydroxide, beef tallow trimethylammonium hydroxide, and coconut oil trimethylammonium hydroxide; and nonionic surfactants such as polyoxyalkylene alkyl ethers, polyoxyalkylene alkyl phenols, polyoxyalkylene alkyl esters, polyoxyalkylene sorbitan esters, polyethylene glycol, polypropylene glycol, diethylene glycol trimethylnonanol ethylene oxide adducts, or mixtures of two or more of such surfactants. Nonionic surfactants and anionic surfactants are most preferred.

The surfactant is used in an amount of 0.05–20 weight percent of the emulsion of condensation crosslinkable silicone composition, preferably in an amount of 0.1–10 weight percent. A surfactant content lower than the minimum of the range can result in an emulsion with a lower stability, whereas an amount greater than the maximum of the range limits the applications of the crosslinked silicone particles.

In the present invention, the condensation crosslinkable silicone composition should be emulsified in water to produce an emulsion with a mean particle diameter of 0.1–500 $\mu$m. It is difficult to produce an emulsion with a mean particle diameter below the minimum of the range, whereas an emulsion with a mean particle diameter above the range will suffer from poor stability. The content of the condensation crosslinkable silicone composition in the emulsion should be 10–90 weight percent of the emulsion, preferably 20–80 weight percent. If the content of the condensation crosslinkable silicone composition is below the range, it is more difficult to dehydrate the emulsion to recover crosslinked silicone particles, and applications of aqueous suspensions of the crosslinked silicone particles will be more limited. A content of condensation crosslinkable silicone composition above the range can result in an aqueous suspension of crosslinked silicone particles that is more difficult to handle.

The invention is characterized by the use as condensation catalyst (C), an emulsion containing a tin (II) salt of an organic acid with no more than 10 carbon atoms, emulsified in water using a surfactant. The condensation catalyst (C) emulsion is added to the emulsion of the condensation crosslinkable silicone composition. The use of an organotin compound or a tin (II) salt of an organic acid with more than ten carbon atoms as the condensation catalyst (C) will not allow the condensation crosslinkable silicone composition to sufficiently crosslink and can even result in no crosslinking at all. In this invention, crosslinking reactions can be effectively achieved by use of the emulsion containing the particular tin (II) salt of an organic acid with no more than 10 carbon atoms, emulsified in water using a surfactant. Some examples of appropriate tin (II) salts of organic acids with no more than ten carbon atoms are tin (II) acetate, tin (II) 2-ethylhexanoate, tin (II) neodecanoate, tin (II) 2,4-pentadionate, and tin (II) octanoate. Tin (II) octanoate is especially preferred.

The emulsion of the tin (II) salt can be prepared by emulsifying the tin (II) salt directly in the water using a surfactant, or by diluting the tin (II) salt in an organic solvent as a more uniform and fine emulsion and then emulsifying it in water with a surfactant. The surfactants noted previously can be used for this purpose. The surfactant should be blended in an amount of 0.01–1,000 weight parts per 100 weight parts of the tin (II) salt.

When the tin (II) salt is diluted with an organic solvent, the organic solvent can be an alcohol with no more than four carbon atoms such as methanol, ethanol, n-propanol, isopropanol, and t-butanol; or a ketone such as acetone or methyl ethyl ketone. The lower alcohols are preferred. An emulsifier such as a colloid mill or homogenizer can be used to produce the emulsion of the tin (II) salt. While the mean particle diameter of the condensation catalyst (C) emulsion is not limited, a mean diameter of no more than 10 $\mu$m is preferred.

The amount of tin (II) salt used is preferably 0.01–20 weight parts, more preferably 0.1–10 weight parts, per 100 weight parts of the condensation crosslinkable silicone composition. Adding it in an amount lower than the range can make it more difficult to crosslink the condensation crosslinkable silicone composition, whereas its presence in an amount above the range can result in crosslinked silicone particles with diminished physical properties.

After the emulsion containing the tin (II) salt has been added to the emulsion of the condensation crosslinkable silicone composition, the crosslinking reaction of the condensation crosslinkable silicone composition will proceed. However, if the temperature of the emulsion is too low, the crosslinking reaction will progress slowly, whereas a high temperature will compromise the stability of the emulsion. The temperature of the emulsion should therefore be 5-70 ° C.

Crosslinked silicone particles thus obtained generally have a mean particle diameter of 0.1-500 $\mu$m and a spherical shape. Such crosslinked silicone particles, when added to an organic resin, are able to impart to the organic resin better impact resistance and better blocking resistance. Additionally, using crosslinked silicone particles with a type A durometer hardness, determined according to the protocol of Japanese Industrial Standard (JIS) K 6253, of 10-95, preferably 20-90, avoids damaging film surfaces by sliding action between organic resin films.

Crosslinked silicone particles according to the invention are in the form of an aqueous suspension, but the suspension can be dehydrated if desired, when there is a need to obtain only crosslinked silicone particles. The aqueous suspension of crosslinked silicone particles can be dehydrated by spraying it into hot air.

The surface of the crosslinked silicone particles can be coated with fine particles of a metal oxide or fine particles of a silicone resin, to improve dispersion of the crosslinked silicone particles in organic resins. One example of a method for coating the surface of the crosslinked silicone particles with a metal oxide or silicone resin particle is to add the metal oxide sol or a hydrolyzed silane condensate to the aqueous suspension of the crosslinked silicone particles, and dehydrate the suspension. Another method is to manually or mechanically coat the crosslinked silicone particles with the metal oxide powder or the hydrolyzed silane condensate.

Crosslinked silicone particles according to this invention can be blended with organic resins among which are silicone resins; polyolefin resins such as polyethylene and polypropylene resins; epoxy resins; polyurethane resins; urea resins; acrylic resins; polycarbonate resins; polystyrene resins; and nylon resins. They can also be blended with a silicone rubber latex, and with a rubber latex containing polybutadiene or natural organic rubber.

The crosslinked silicone particles are especially useful as a flexibilizer for making organic resins or rubbers more impact resistant, as a surface lubricant for providing organic resin films with blocking resistance, and as a delustrant for paint. The crosslinked silicone particles also have excellent compatibility with organic solvents such as toluene, xylene, mineral spirits, kerosene, octamethylcyclotetrasiloxane, decamethylcyclopentasiloxane, and hexamethyldisiloxane. They can therefore be used as fillers for paints and inks.

EXAMPLES

The following examples are set forth in order to illustrate this invention in more detail. The properties of the crosslinked silicone particles were determined in the following manner.

Hardness of Crosslinked Silicone Particles

A condensation crosslinkable silicone composition containing a condensation catalyst was crosslinked by being allowed to stand for one week at 25° C. and provided a one mm thick crosslinked silicone sheet. The type A durometer hardness of the crosslinked silicone particles according to JIS K 6253 (1997) was determined using a Wallace microhardness meter manufactured by H. W. Wallace Co.

Mean Particle Diameter of Crosslinked Silicone Particles

An aqueous suspension of crosslinked silicone particles was measured using a laser diffraction instrument for measuring particle size distribution. The instrument was a Model LA-500 manufactured by Horiba Seisakusho. The median diameter, i.e., the particle diameter corresponding to 50 percent of the cumulative distribution, was used as the mean particle diameter of the crosslinked silicone particles.

Mean Particle Diameter of Condensation Catalyst Emulsion

The mean particle diameter of the condensation catalyst emulsion was determined using a laser scattering submicron particle analyzer. The device was a Coulter Model N4 manufactured by Coulter Electronics.

Example 1

84.7 weight parts of a dimethylpolysiloxane of the formula HO{$(CH_3)_2SiO$}$_{11}$H, 10.5 weight parts of ethyl polysilicate of the formula $(C_2H_5O)_{12}Si_5O_4$ obtained by partial hydrolysis and condensation of tetraethoxysilane, and 4.8 weight parts of $\gamma$-glycidoxypropyl trimethoxysilane, were mixed to homogeneity. The mixture was emulsified in an aqueous solution of 30 weight parts of pure water and one weight part of the anionic surfactant sodium polyoxyethylene lauryl sulfate. The ingredients were further uniformly emulsified using a colloid mill, and 58 weight parts of pure water was added to dilute the mixture. This provided an emulsion of a condensation crosslinkable silicone composition.

One weight part of tin (II) octanoate was emulsified to a mean particle diameter of about 1.2 $\mu$m in an aqueous solution of 0.25 weight part of sodium polyoxyethylene lauryl sulfate anionic surfactant and 9.75 weight parts of pure water. The resulting condensation catalyst emulsion was mixed with the emulsion of the condensation crosslinkable silicone composition, and allowed to stand for a day. The product was a homogenous, ungelled aqueous suspension of crosslinked silicone particles. Subsequent filtration of the aqueous suspension through a 200 mesh screen retained on the screen less than 0.1 weight percent of crosslinked silicone particles based on the total amount filtered. The crosslinked silicone particles were in the form of a rubber having a type A durometer hardness of 60 and a mean particle diameter of 2 $\mu$m.

Example 2

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of allyltrimethoxysilane, were mixed to homogeneity. The mixture was emulsified in an aqueous solution containing 30 weight parts of pure water and one weight part of sodium polyoxyethylene lauryl sulfate anionic surfactant. The mixture was further uniformly emulsified in a colloid mill, and 58 weight parts of pure water was added to dilute the mixture. This provided an emulsion of condensation crosslinkable silicone composition.

One weight part of tin (II) octanoate was emulsified to a mean particle diameter of about 1.2 $\mu$m in an aqueous solution of 0.25 weight part of sodium polyoxyethylene lauryl sulfate anionic surfactant and 9.75 weight parts of pure water. The condensation catalyst emulsion was mixed with the emulsion of condensation crosslinkable silicone composition and allowed to stand for one day. The result was a homogenous, ungelled aqueous suspension of crosslinked silicone particles. Filtration of the aqueous suspension of crosslinked silicone particles through a 200 mesh screen left less than 0.1 weight percent of crosslinked silicone particles on the screen, based on the total amount of aqueous suspension passed through the screen. The crosslinked silicone particles were a rubber having a type A durometer hardness of 60 and a mean particle diameter of 2 $\mu$m.

Example 3

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of γ-mercaptopropyltrimethoxysilane, were mixed to homogeneity. The mixture was emulsified in an aqueous solution of 30 weight parts of pure water and one weight part of sodium polyoxyethylene lauryl sulfate anionic surfactant. The mixture was further uniformly emulsified in a colloid mill, and 58 weight parts of pure water was added to dilute the mixture, providing an emulsion of condensation crosslinkable silicone composition.

One weight part of tin (II) octanoate was emulsified to a mean particle diameter of about 1.2 $\mu$m in an aqueous solution of 0.25 weight part of sodium polyoxyethylene lauryl sulfate anionic surfactant, and 9.75 weight parts of pure water. The resulting condensation catalyst emulsion was mixed with the emulsion of condensation crosslinkable silicone composition and allowed to stand for one day, providing a homogenous, ungelled aqueous suspension of crosslinked silicone particles. Filtration of the aqueous suspension of crosslinked silicone particles through a 200 mesh screen left less than 0.1 weight percent of crosslinked silicone particles on the screen, based on the total amount of aqueous suspension passed through the screen. The crosslinked silicone particles were a rubber having a type A durometer hardness of 61 and a mean particle diameter of 2 $\mu$m.

Example 4

86.3 weight parts of a dimethylpolysiloxane of the formula $HO\{(CH_3)_2SiO\}_{11}H$, 11.3 weight parts of ethyl polysilicate of the formula $(C_2H_5O)_{12}Si_5O_4$ obtained by partial hydrolysis and condensation of tetraethoxysilane, and 2.4 weight parts of γ-(2-aminoethyl)aminopropyl methyldimethoxysilane, were mixed to homogeneity. The mixture was emulsified in an aqueous solution of 30 weight parts of an aqueous solution of 5 weight percent of polyoxyethylene (9) nonylphenyl ether nonionic surfactant. The mixture was further uniformly emulsified in a colloid mill, and 59 weight parts of pure water were added to dilute the mixture, providing an emulsion of condensation crosslinkable silicone composition.

One weight part of tin (II) octanoate was emulsified to a mean particle diameter of about 0.5 $\mu$m in an aqueous solution of 9 weight parts of pure water and one weight part of nonionic surfactant polyoxyethylene (9) nonylphenyl ether, and the resulting condensation catalyst emulsion was mixed with the emulsion of condensation crosslinkable silicone composition and allowed to stand for one day, providing a homogenous, ungelled aqueous suspension of crosslinked silicone particles. Filtration of the aqueous suspension of crosslinked silicone particles through a 200 mesh screen left less than 0.1 weight percent of crosslinked silicone particles on the screen, based on the total amount of aqueous suspension passed through the screen. The crosslinked silicone particles were a rubber having a type A durometer hardness of 63 and a mean particle diameter of 2 $\mu$m.

Comparative Example 1

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of γ-glycidoxypropyltrimethoxysilane, were mixed to homogeneity. One weight part of tin (II) octanoate was added to the mixture and the components were mixed to homogeneity. The mixture was rapidly emulsified in an aqueous solution of 30 weight parts of pure water and one weight part of sodium polyoxyethylene lauryl sulfate anionic surfactant. The mixture was further uniformly emulsified using a colloid mill, and 58 weight parts of pure water was added to dilute the mixture, providing an emulsion of condensation crosslinkable silicone composition. Crosslinking commenced immediately after emulsification and portions of the emulsion separated. The emulsion was allowed to stand for one day providing an aqueous suspension of crosslinked silicone particles. Filtration of the aqueous suspension of crosslinked silicone particles through a 200 mesh screen left 3.7 weight percent of crosslinked silicone particles on the screen, based on the total amount of aqueous suspension passed through the screen. The crosslinked silicone particles were a rubber having a type A durometer hardness of 63 and a mean particle diameter of 15 μm.

Comparative Example 2

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of γ-glycidoxypropyltrimethoxysilane, were mixed to homogeneity. The mixture was emulsified in an aqueous solution of 30 weight parts of pure water and one weight part of sodium polyoxyethylene lauryl sulfate anionic surfactant. The mixed ingredients were further uniformly emulsified using a colloid mill, and 58 weight parts of pure water were added to dilute the mixture, providing an emulsion of condensation crosslinkable silicone composition.

Two weight parts of a toluene solution of 50 weight percent stearic acid was emulsified to a mean particle diameter of about 12 Ξm and more in an aqueous solution of 0.25 weight part of sodium polyoxyethylene lauryl sulfate anionic surfactant and 9.75 weight parts of pure water. The resulting condensation catalyst emulsion was mixed with the emulsion of condensation crosslinkable silicone composition and allowed to stand for one day. However, the condensation crosslinkable silicone composition was not crosslinked and the product was an oily substance.

Comparative Example 3

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of γ-glycidoxypropyltrimethoxysilane, were mixed to homogeneity. The mixture was emulsified in an aqueous solution of 30 weight parts of pure water and one weight part of sodium polyoxyethylene lauryl sulfate anionic surfactant. The mixture of ingredients was further uniformly emulsified using a colloid mill, and 58 weight parts of pure water were added to dilute the mixture, providing an emulsion of condensation crosslinkable silicone composition.

One weight part of dibutyltin dilaurate was emulsified to a mean particle diameter of about 12 μm or more in an aqueous solution of 0.25 weight part of sodium polyoxyethylene lauryl sulfate anionic surfactant and 9.75 weight parts of pure water. The resulting condensation catalyst emulsion was mixed with the emulsion of condensation crosslinkable silicone composition and allowed to stand for one day. However, the condensation crosslinkable silicone composition was not crosslinked and produced only an oily substance.

Comparative Example 4

84.7 weight parts of a dimethylpolysiloxane of the formula $HO\{(CH_3)_2SiO\}_{11}H$, 10.5 weight parts of ethyl polysilicate of the formula $(C_2H_5O)_{12}Si_5O_4$ obtained by partial hydrolysis and condensation of tetraethoxysilane, and 4.8 weight parts of γ-glycidoxypropyltrimethoxysilane, were mixed to homogeneity. The mixture was emulsified in an aqueous solution of 30 weight parts of pure water and one weight part of sodium polyoxyethylene lauryl sulfate anionic surfactant. The mixture of ingredients was further uniformly emulsified in a colloid mill, and 58 weight parts of pure water was added to dilute the mixture, providing an emulsion of condensation crosslinkable silicone composition.

One weight part of tin (II) octanoate was added as drops in the emulsion of condensation crosslinkable silicone composition. The mixture was allowed to stand for one day, but the condensation crosslinkable silicone composition was not crosslinked, resulting only in an oily substance.

Application Example

The aqueous suspensions of crosslinked silicone particles prepared in Examples 1-4 and in Comparative Examples 1-4 were added in an amount of 1.5 weight parts of crosslinked silicone particles per 100 weight parts of paint solids in an aqueous urethane resin paint of Kansai Paint or in an aqueous acrylic resin paint of Kansai Paint. A coating composition was produced after 50 cycles of shaking of the mixture. Polyethylene terephthalate (PET) films were coated with each paint composition, and then heated and dried for 10 minutes at 100° C., forming coated films about 15 μm thick.

The coated films were examined using an optical microscope at a magnification of 1000 to determine the presence of pinholes caused by crosslinked silicone particles which had fallen from or otherwise been removed from the coated film. The absence of pinholes on the coated film was rated O, whereas their presence was rated x. The results are shown in Table 1.

TABLE 1

| Crosslinked silicone particles | Example 1 | Example 2 | Example 3 | Example 4 | Comparative Example 1 |
|---|---|---|---|---|---|
| Urethane resin | ○ | ○ | ○ | ○ | ○ |
| Acrylic resin | ○ | ○ | ○ | ○ | ○ |

The coated film surfaces were examined for their delustrant property. A high degree of delustrant effect and particle aggregates of no more than 30 μm was rated O, an effective delustrant property and aggregate particles of more than 30 μm was rated Δ, and a low delustrant effect was rated x. The results are shown in Table 2.

TABLE 2

| Crosslinked silicone particles | Example 1 | Example 2 | Example 3 | Example 4 | Comparative Example 1 |
|---|---|---|---|---|---|
| Urethane resin | ○ | ○ | ○ | ○ | Δ |
| Acrylic resin | ○ | ○ | ○ | ○ | Δ |

The coated film surfaces were examined for the presence of damage after having being rubbed five times with a piece of polypropylene resin. An undamaged coated film was rated O, while a damaged film was rated x. The results are shown in Table 3.

TABLE 3

| Crosslinked silicone particles | Example 1 | Example 2 | Example 3 | Example 4 | Comparative Example 1 |
|---|---|---|---|---|---|
| Urethane resin | ○ | ○ | ○ | ○ | x |
| Acrylic resin | ○ | ○ | ○ | ○ | x |

It should be apparent from the above that the method according to this invention for making suspension containing crosslinked silicone particles results in a more efficient production of the crosslinked silicone particles having a lower mean particle diameter and better dispersion in organic resins.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making a suspension of crosslinked silicone particles having a mean particle diameter of 0.1–500 μm comprising forming a condensation crosslinkable silicone composition containing an organopolysiloxane (A) having at least two silanol groups per molecule and a crosslinker (B), but without a condensation catalyst (C); emulsifying the condensation crosslinkable silicone composition (A) and (B) in water using a surfactant; forming an emulsion of a tin (II) salt of an organic acid with no more than ten carbon atoms, in water using a surfactant; adding the tin (II) salt emulsion as the condensation catalyst (C) to the emulsion of the condensation crosslinkable silicone composition (A) and (B), in order to crosslink the condensation crosslinkable silicone composition (A) and (B) resulting in the formation of the suspension of crosslinked silicone particles having a mean particle diameter of 0.1–500 μm.

2. A method according to claim 1 in which the tin (II) salt emulsion has a mean particle diameter of no more than 10 μm.

3. A method according to claim 1 in which the tin (II) salt is formed from a saturated organic fatty acid with no more than 10 carbon atoms.

4. A method according to claim 3 in which the tin (II) salt is tin (II) octanoate.

5. A method according to claim 1 in which crosslinker (B) is a silane with at least three silicon bonded hydrolyzable groups per molecule or a partially hydrolyzed condensate thereof.

6. A method according to claim 1 in which the condensation crosslinkable silicone composition (A) and (B) includes an organoalkoxysilane (D) with at least one group selected from the group consisting of an alkyl group with five or more carbon atoms, a (meth)acrylic group, an epoxy group, a mercapto group, an amino group, an alkenyl group, or partially hydrolyzed condensates thereof.

7. The method of claim 1, where component (B) is an organosiloxane having at least three silicone atom bonded hydrogen atoms per molecule.

8. The method of claim 1, where the condensation crosslinkable silicone composition further comprises a reinforcing filler, a nonreinforcing filler, a filler treated with an organosilicon compound, a pigment, an organic compound with an epoxy or amino group, a heat resistant imparting agent, a flame retardant, plasticizer, or noncrosslinking type of organopolysiloxane.

9. The method of claim 1 further comprising heating the condensation crosslinkable silicone composition during emulsification.

10. The method of claim 1 where the tin (II) salt of organic acid with no more than ten carbon atoms is tin (II) acetate, tin (II) 2-ethylhexanoate, tin (II) neodecanoate, tin (II) 2,4-pentadionate, or tin (II) octanoate.

11. The method of claim 1 further comprising diluting the tin (II) salt of organic acid in an organic solvent prior to emulsifying the tin (II) salt of organic acid in water with a surfactant.

12. The method of claim 1 further comprising dehydrating the suspension of crosslinked silicone particles having a mean particle diameter of 0.1–500 μm crosslinked silicone particles.

13. The method of claim 12 further comprising coating the surface of the crosslinked silicone particles with fine particles of a metal oxide or fine particles of a silicone resin, to improve dispersion of the crosslinked silicone particles in organic resins.

14. The method of claim 12 further comprising blending the crosslinked silicone particles with silicone resins, polyolefin resins, epoxy resins, polyurethane resins, urea resins, acrylic resins, polycarbonate resins, polystyrene resins, nylon resins, silicone rubber latex, or rubber latex containing polybutadiene or natural organic rubber.

* * * * *